United States Patent
Takikawa et al.

(10) Patent No.: US 6,986,877 B2
(45) Date of Patent: Jan. 17, 2006

(54) METHOD FOR PREPARING NANO-CARBON FIBER AND NANO-CARBON FIBER

(75) Inventors: Hirofumi Takikawa, Toyohashi (JP); Shigeo Itoh, Mobara (JP)

(73) Assignee: Futaba Corporation, Mobara (JP)

( * ) Notice: Subject to any disclaimer, the term of this patent is extended or adjusted under 35 U.S.C. 154(b) by 0 days.

(21) Appl. No.: 10/334,904

(22) Filed: Jan. 2, 2003

(65) Prior Publication Data
US 2003/0148097 A1 Aug. 7, 2003

(30) Foreign Application Priority Data
Jan. 8, 2002 (JP) .............................. 2002-001773

(51) Int. Cl.
*D01F 9/12* (2006.01)

(52) U.S. Cl. .................................. 423/447.3

(58) Field of Classification Search ............. 423/447.3, 423/447.1, 445 R, 455 B
See application file for complete search history.

(56) References Cited

U.S. PATENT DOCUMENTS

| 6,333,016 | B1 * | 12/2001 | Resasco et al. .......... 423/447.3 |
| 6,518,218 | B1 * | 2/2003 | Sun et al. .................... 502/259 |
| 6,558,645 | B2 * | 5/2003 | Nakayama et al. ..... 423/445 B |
| 6,808,746 | B1 * | 10/2004 | Dai et al. ................. 427/249.1 |
| 2003/0108480 | A1 * | 6/2003 | Baker et al. ............. 423/447.3 |

FOREIGN PATENT DOCUMENTS

GB  2248230 A  *  4/1992

* cited by examiner

Primary Examiner—Stanley S. Silverman
Assistant Examiner—Peter J. Lish
(74) Attorney, Agent, or Firm—Oblon, Spivak, McClelland, Maier & Neustadt, P.C.

(57) ABSTRACT

A carbon nano-fiber, particularly twisted carbon nano-fiber such as a carbon nano-coil, carbon nano-twist, carbon nano-rope is produced by means of a catalyst CVD method using carbon-containing gas as a raw material and a catalyst comprising one or plural components selected from the group consisting of Cr, Mn, Fe, Co, Ni and oxide thereof and one or plural components selected from the group consisting of Cu, Al, Si, Ti, V, Nb, Mo, Hf, Ta, W and oxide thereof is used.

6 Claims, 6 Drawing Sheets

METHOD FOR PREPARING NANO-CARBON FIBER AND NANO-CARBON FIBER

BACKGROUND OF THE INVENTION

1. Field of the Invention

The present invention relates to a nano-carbon fiber and a method for preparing the same. The nano-carbon fiber of the present invention is used for an electronic device, an electrode of a secondary battery or fuel battery, hydrogen absorbing material, composite material and electromagnetic wave absorber.

2. Discussion of Background

Almost all of the conventional carbon nano-fibers (carbon superfine fiber) are straight fibers such as VGCF (vapor growth carbon fiber), carbon nano-tube, etc. A carbon microcoil having a fiber diameter in the order of micrometer or a carbon nano-coil having a fiber diameter finer than that of the former has been known as a spiral carbon fiber. Such spiral carbon fibers are produced by the use of a catalyst. Particularly, a carbon nano-coil is produced by the use of Fe.In.Sn mixed catalyst or mixed catalyst of oxide thereof (Unexamined Japanese Patent Publication (Kokai) No. 2001-192204) or Ni catalyst carried on Cu substrate (Unexamined Japanese Patent Publication (Kokai) No. 2001-240403).

It is expected that a carbon fiber is applied to wide variety of uses, for example, an electronic device such as an electron emission source, a display tube, a display panel, an emission display, an emission tube, an emission panel, etc. using the electron emission source, an electrode for a secondary battery or fuel battery, a hydrogen absorbing material, an electromagnetic wave absorber, additives to be added into rubber, plastics, resin, metal, ceramic, concrete, etc. for improving functions such as mechanical strength, color, electrical conductivity, thermal conductivity, etc. A mixture of a carbon fiber with rubber, plastics, resin, metal, ceramic or concrete, etc. is called "composite" or "composite material."

Above all, a spiral or twisted carbon fiber shows various properties which a straight carbon fiber does not possess. For example, the spiral or twisted carbon fiber has a large surface area compared with a straight carbon fiber having the same length of fiber, has a fine curved surface or angle as seen from any direction, has an electrical inductance, and has a mechanical spring function.

Therefore, a development of application is possible by using such characteristics. When a spiral or twisted carbon fiber is applied to the above-described applications, a method has been required for preparing such a carbon fiber effectively and in high volumes, and a technology for controlling the shape thereof has been required.

Unfortunately, however, there has not been proposed a mass-production and controlling method of a carbon fine fiber such as spiral (coil-shaped) or twisted carbon fiber having a fiber diameter of 1 $\mu$m and below.

SUMMARY OF THE INVENTION

An object of the present invention is to provide a method of preparing a carbon nano-fiber by the use of a catalyst suitable for preparing a carbon nano-fiber having a given shape.

Another object of the present invention is to provide a method of preparing a carbon nano-fiber by the use of a catalyst suitable for preparing a carbon nano-fiber having a fiber diameter and outer diameter finer than those of carbon microcoil such as a spiral (coil-shaped), twisted carbon fiber or rope-shaped carbon fiber.

Further object of the present invention is to provide a method of preparing a carbon nano-fiber under control of fiber diameter of carbon nano-fiber, particularly twisted carbon nano-fiber.

These and other objects of the present invention can be achieved by the aspects of the present inventions described below.

A method of preparing a carbon nano-fiber according to an aspect of the present invention comprises the step of growing a carbon nano-fiber on a catalyst by means of a catalyst CVD method using carbon-containing raw material gas, in which the catalyst comprises one component selected from the group consisting of Cr, Mn, Co, Ni and oxide thereof and one or plural components selected from the group consisting of Zn, In, Sn, Sb and oxide thereof. The term "catalyst CVD method" herein used includes methods such as vapor thermal decomposition method, etc.

A method of preparing a carbon nano-fiber according to another aspect of the present invention comprises the step of growing a carbon nano-fiber on a catalyst by means of a catalyst CVD method using carbon-containing raw material gas, in which the catalyst comprises plural components selected from the group consisting of Cr, Mn, Fe, Co, Ni and oxide thereof and one or plural components selected from the group consisting of Zn, In, Sn, Sb and oxide thereof.

A method of preparing a carbon nano-fiber according to still another aspect of the present invention comprises the step of growing a carbon nano-fiber on a catalyst by means of a catalyst CVD method using carbon-containing raw material gas, in which the catalyst comprises one or plural components selected from the group consisting of Cr, Mn, Fe, Co, Ni and oxide thereof and one or plural components selected from the group consisting of Cu, Al, Si, Ti, V, Nb, Mo, Hf, Ta, W and oxide thereof.

A method of preparing a carbon nano-fiber according to additional aspect of the present invention comprises the step of growing a carbon nano-fiber on a catalyst by means of a catalyst CVD method using carbon-containing raw material gas, in which the catalyst comprises one or plural components selected from the group consisting of Cr, Mn, Fe, Co, Ni and oxide thereof and one or plural components selected from the group consisting of Zn, In, Sn, Sb and oxide thereof.

In the method of preparing a carbon nano-fiber according to an aspect of the present invention, the catalyst is composed of a multilayer catalyst film, and the catalyst film constituting the multilayer catalyst film formed of one component selected from the group consisting of Cr, Mn, Co, Ni and oxide thereof, or the catalyst film constituting the multilayer catalyst film formed of plural components selected from the group consisting of Cr, Mn, Fe, Co, Ni and oxide thereof, or the catalyst film constituting the multilayer catalyst film formed of one or plural components selected from the group consisting of Cr, Mn, Fe, Co, Ni and oxide thereof has a film thickness of 0.1 nm~100 nm.

In the method of preparing a carbon nano-fiber according to another aspect of the present invention, the catalyst is composed of a multilayer catalyst film, and that a catalyst film constituting the multilayer catalyst film formed of one or plural components selected from the group consisting of Zn, In, Sn, Sb and oxide thereof has a film thickness of 1 nm~500 nm.

In the method of preparing a carbon nano-fiber according to still another aspect of the present invention, the catalyst is composed of a multilayer catalyst film, and a catalyst film constituting the multilayer catalyst film formed of one or plural components selected from the group consisting of Al, Si, Ti, V, Nb, Mo, Hf, Ta, W and oxide thereof has a film thickness of 0.1 nm~100 nm.

In the method of preparing a carbon nano-fiber according to additional aspect of the present invention the catalyst is formed of a catalyst fine particle, catalyst solution or solution of catalyst fine particle.

A carbon nano-fiber according to an aspect of the present invention is formed in a twisted state at least a part thereof and has a fiber outer diameter of 1 nm~1 μm, a twist pitch of 1 nm~500 nm, and a length of 5 nm and above.

A carbon nano-fiber according to another aspect of the present invention is formed in a state of rope at least a part thereof and has a fiber outer diameter of 3 nm~1 μm, a twist pitch of 3 nm~1 μm, and a length of 5 nm and above.

BRIEF DESCRIPTION OF THE DRAWINGS

For more complete understanding of the present invention may be had with reference to the following detailed explanations in connection with the accompanying drawings, in which.

DETAILED DESCRIPTION OF THE PREFERRED EMBODIMENTS

The present invention uses a specific catalyst in order to synthesize effectively and in high volumes a spiral (coil) or twisted carbon fiber substance composed of carbon as a main component having a fiber diameter and outer diameter finer than those of carbon nano-coil by a vapor chemical deposition method such as a catalyst CVD method (catalyst chemical vapor deposition) or vapor thermal decomposition, etc.

The present invention controls a fiber diameter by preparing the specific catalyst.

According to the present invention, the chemical vapor deposition method (CVD method) includes a thermal CVD method, a thermal filament-supported CVD method, a plasma CVD method, etc. can be used.

The present invention uses a fluidized bed method (fluid vapor method) for growing a spiral (coil) or twisted carbon fiber substance from catalyst fine particles by using a substrate method in which the spiral (coil) or twisted carbon fiber substance is deposited and grown on the surface of a catalyst substrate placed in a reactor or by injecting or passing catalyst particles into or through a reactor.

The specific catalyst used in the present invention is a mixed material comprising Cr, Mn, Fe, Co, Ni, Zn, In, Sn, Sb, Cu, Al, Si, Ti, V, Nb, Mo, Hf, Ta, W or oxide thereof. These catalysts are used in a state of a film (layer) in the case of a substrate method, and in a state of solution, fine particles or fine particles mixed-solution in the case of a fluidized bed method.

Preferred embodiments of the present invention are described below with reference to the accompanying drawings. It will be understood that the present invention is not limited to the construction shown in the drawings, but includes various modifications and changes in design.

A spiral (coil-shaped,) twisted or rope-shaped carbon superfine fiber having fine fiber diameter and outer diameter are referred to as "carbon nano-coil" "carbon nano-twist" and "carbon nano-rope," respectively hereinafter. Carbon nano-coil, carbon nano-twist and carbon nano-rope is not necessarily hollow such as a carbon nano-fiber, but may be hollow such as a carbon nano-tube.

The carbon nano-coil of the present invention has a structure having space, that is, a structure having a hole in its central portion as seen from its longitudinal direction.

The carbon nano-twist and carbon nano-rope of the present invention has a structure having no space, that is, a structure having no hole in its central portion as seen from its longitudinal direction. Further, the carbon nano-twist of the present invention has such a structure that a carbon nano-tube is twisted. The carbon nano-rope of the present invention has such a structure that a plurality of carbon nano-fibers is twisted and intertwined, that is, plural carbon nano-twists are intertwined.

More strictly speaking, the carbon nano-twist of the present invention has such a structure that one or more carbon nano-fibers are twisted. In many cases, one carbon nano-fiber is twisted and two carbon nano-fibers are occasionally twisted. In case that two carbon nano-fibers are twisted, they are twisted alternately. On the other hand, the carbon nano-rope of the present invention has such a structure that more than one of carbon nano-fibers are twisted at the same time. In many cases, more than two of carbon nano-fibers are twisted.

Figure 1:
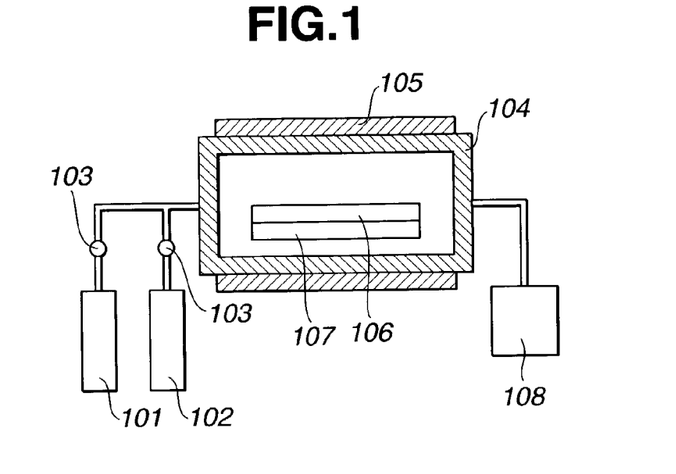
FIG. 1 is a diagrammatic view showing an apparatus for preparing carbon nano-fiber used for a CVD method on the basis of substrate method.

FIG. 1 is a diagrammatic view showing an apparatus for preparing a carbon nano-fiber used in an embodiment of the present invention. The apparatus is a most fundamental type of thermal CVD apparatus classified as a substrate method.

As shown in FIG. 1, the apparatus of the present invention comprises a reactor 104 as a reacting container, a gas steel bottle for supplying raw material gas 101 and diluting gas 102 to the reactor 104, a gas flow controller 103 for distributing raw material gas 101 and dilution medium gas 102 at constant flow rate, a heating apparatus 105 for heating at least a vicinity of catalyst in the reactor 104, a substrate 107 as a substrate on which is carried a catalyst film, and an exhaust apparatus 108 for exhausting the reactor 104.

As the raw material gas may be used hydrocarbon gas such as $CH_2$, $C_2H_2$, $C_2H_4$, $C_6H_6$, etc., or carbon-gas such as CO, $CO_2$, etc. Alternatively, a carbon-containing organic solvent such as toluene, xylene, etc. may be vaporized to introduce into the reactor. Above all, $C_2H_2$, CO and an organic solvent such as toluene, xylene, etc. having low decomposition temperature are effective. Since $C_2H_4$ is hard to thermally decompose compared with $C_2H_2$, CO and an organic solvent such as toluene, xylene, etc., it is desirable to use a thermal CVD method (reference should be made Unexamined Japanese Patent Publication (Kokai) No. 2001-240403).

As diluting gas 102 may be preferably used rare gas such as He, Ne, Ar, etc. or $H_2$, $N_2$, etc. Fluorinated gas or chlorinated gas may be used. When He and Ar are used, a carbon nano-coil or carbon nano-twist can be effectively synthesized, because of their low reactivity. Particularly, Ar may be more preferably used from the standpoint of thermal capacity.

When a minute amount of fluorinated gas or chlorinated gas is added, chemical modification of carbon nano-fiber can be suitably carried out.

As the gas flow controller 103, a commercially available gas flow meter or gas flow controller may be used.

As the reactor 104, quartz glass is usually used, but ceramic may be used. In general, quartz glass is easy to be available. A large diameter pipe is cheap. Reactor temperature may be 500~1000° C. Desirable reactor temperature may be 650~750° C. Most desirable reactor temperature may be 700° C.

While a carbon nano-coil starts to react usually at a temperature of about 600° C. and above, it is possible to start the reaction from a temperature of about 500° C. and above depending on the reaction conditions.

In order to accelerate the decomposition of the raw material gas in the reactor, a hot filament may be placed in the reactor, or plasma may be generated in the reactor.

As the heating apparatus 105, an electric furnace is usually used, but a high temperature vapor heating apparatus may be used, or an infrared ray heating apparatus may be used. The electric furnace is most cheap. When waste heat from a boiler is available, the high temperature vapor heating apparatus is economical. The infrared ray heating apparatus has an advantage in that it can increase temperature instantaneously.

As the substrate 107 on which is carried a catalyst film 106, Si, heat-resistant glass, ceramics, graphite, metal, etc. which are resistant to 1000° C. may be used.

The exhaust apparatus 108 may be a simple bubbler. By passing exhaust gas through the bubbler, it is possible to prevent atmosphere from flowing back into the reactor. An exhaust pump may be used as the exhaust apparatus 108. By the use of an exhaust pump or vacuum pump, there are advantages that exhaust is certainly carried out and the pressure inside the reactor can be controlled. The pressure inside the reactor is not particularly specified, but $1 \times 1^{-2}$ Pa to 100 kPa (atmospheric pressure) may be easy to maintain, and approximately 100 kPa (atmospheric pressure) may be most easy to maintain.

Figure 2A:
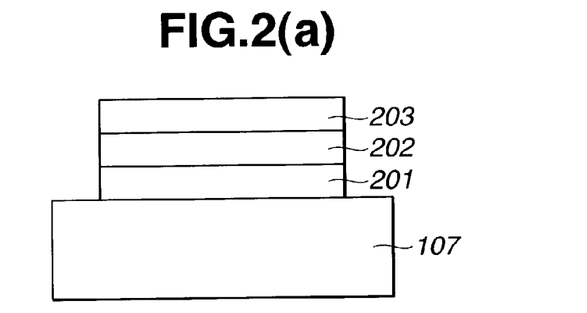
FIG. 2 is a schematic illustration of examples of catalyst films.
Figure 2B:
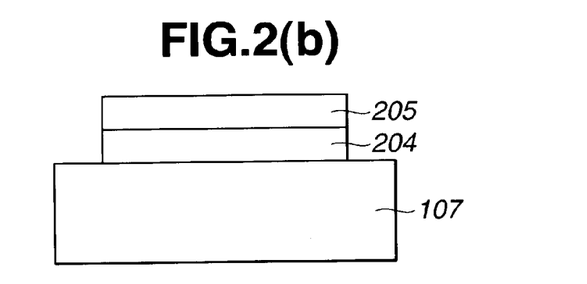
Figure 2C:
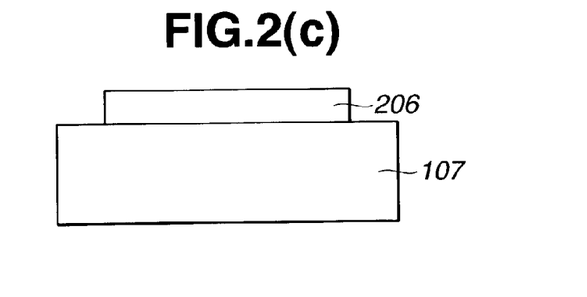

FIGS. 2(a) to 2(c) show examples of the catalyst film 106, wherein FIG. 2(a) shows a catalyst composed of a multilayer film having three layers structure carried on the substrate 107, FIG. 2(b) shows a catalyst composed of a multilayer film having two layers structure carried on the substrate 107, and FIG. 2(c) shows a catalyst composed of a monolayer film having one layer structure carried on the substrate 107.

In FIG. 2(a), the multilayer film having three layers structure comprising a first catalyst film 201, a second catalyst film 202 and a third catalyst film 203 are composed of a film comprising one or plural components selected from the group consisting of Cr, Mn, Fe, Co, Ni and oxide thereof, a film comprising one or plural components selected from the group consisting of Zn, In, Sn, Sb and oxide thereof, and a film comprising Cu or Cu oxide. Metal or metal oxide having low reactivity with carbon may be used instead of Cu or Cu oxide. For example, Al, Si, Ti, V, Nb, Mo, Hf, Ta, W or oxide thereof may be used. Cu, Al, Si and Ti may be desirable from the standpoint of production cost. Cu or Cu oxide may be particularly desirable because they are hard to be carbonized, that is, hard to be carbide.

The catalyst film 106 is not necessarily formed on the whole surface of the substrate 107, but may be formed partially on the surface of the substrate 107, if needed. When using a patterned catalyst film, a film composed of carbon nano-coil, carbon nano-twist or carbon nano-rope can be obtained. When using the film composed of carbon nano-coil, carbon nano-twist or carbon nano-rope as an electron emission source for a display tube such as display etc., a patterned film composed of carbon nano-coil, carbon nano-twist or carbon nano-rope is useful because each of patterns can be used as an electron emission source for each pixel of a display.

The catalyst film may be composed of a two-layer film or multilayer film comprising a film having one or plural components selected from the group consisting of Cr, Mn, Fe, Co, Ni and oxide thereof and a film having one or plural components selected from the group consisting of Zn, In, Sn, Sb and oxide thereof. In such a case, control of fiber diameter is hard. In the production of carbon nano-twist, the catalyst film may be composed of two-layers film or multilayer film comprising a film having one or plural components selected from the group consisting of Cr, Mn, Fe, Co, Ni and oxide thereof and a film having Cu or Cu oxide, provided that a two-layers film of binary catalyst may be desirable from the standpoint of production cost etc. Naturally, Al, Si, Ti, V, Nb, Mo, Hf, Ta, W or oxide thereof may be used. A catalyst film composed of a Ni film and Cu film may be particularly preferably used because a carbon nano-twist can be effectively synthesized.

The order of film is not particularly specified, but it is desirable that a film composed of Cu, Al, Si, Ti, V, Nb, Mo, Hf, Ta, W or oxide thereof is a first layer, a film composed of one or plural components selected from the group consisting of Zn, In, Sn, Sb or oxide thereof is a second layer, and a film composed of one or plural components selected from the group consisting of Cr, Mn, Fe, Co, Ni or oxide thereof is a third layer.

The film composed of plural components selected from the group consisting of Zn, In, Sn, Sb or oxide thereof may be a monolayer film composed of plural components, or may be a multilayer film composed of each component. For example, when a mixed film composed of In oxide and Sn oxide is used, an ITO (Indium-Tin Oxide) monolayer film can be used, and when a film composed of Sn oxide and Sb oxide is used, an ATO (Antimony-Tin Oxide) monolayer film can be used. When Sn oxide and Sb oxide or In oxide and Zn oxide are used for components of a catalyst film, it is desirable to prepare independently a monolayer film composed of each of such oxides by vacuum evaporation.

The film thickness of each catalyst film of the first, second and third layers is not particularly specified, but is preferably in the range of 0.1 nm (thickness of one atomic layer)~1 µm. While there is no problem in case of thickness of 1 µm and above, 1 µm at the most may be desirable from the standpoint of production cost. This is because that the film surface mainly contributes to the reaction. Particularly, the thickness of a film composed of one or plural components selected from the group consisting of Cr, Mn, Fe, Co, Ni or oxide thereof may be preferably in the range of from 0.1 nm to 100 nm. In case of 100 nm and above, there are many cases that a fiber diameter of fiber exceeds 1 $\mu$m.

The thickness of a film composed of one or plural components selected from the group consisting of Zn, In, Sn, Sb or oxide thereof may be preferably in the range of from 1 nm to 500 nm. When there is no film composed of Cu or Cu oxide, there are many cases that the fiber diameter of carbon nano-fiber has a thickness nearly equivalent to the particle diameter of catalyst fine particle. Therefore, even when the thickness is in the order of 500 nm, there is scarcely case that the fiber diameter of carbon nano-fiber exceeds 1 $\mu$m. The thickness of a film composed of Cu or Cu oxide may be preferably in the range of from 0.1 nm to 100 nm.

When a catalyst composed of Cu or Cu oxide exists, there are many cases that the fiber diameter of carbon nano-fiber is two or three times the particle diameter of catalyst fine particle. The thickness of a film composed of Cu or Cu oxide has the function of controlling the fiber diameter of carbon nano-coil, carbon nano-twist or carbon nano-rope, etc. Such a thing is explained with reference to FIGS. 3(a) to 3(e).

Figure 3A:
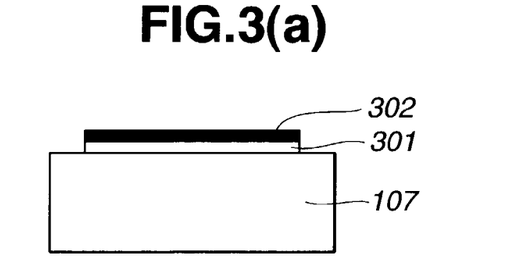
FIG. 3 is a diagram explaining the function of Cu or Cu oxide film.
Figure 3B:
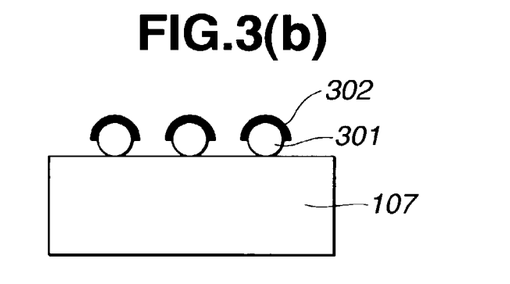

As shown in FIG. 3(a), Cu, Al, Si, Ti, V, Nb, Mo, Hf, Ta, W or oxide thereof does not easily react with carbon. When such a component is heated at about 700° C., a thin film composed of such a component becomes a spherical fine particle as shown in FIG. 3(b). A film composed of Cu or Cu oxide is particularly desirable because it is easy to become a spherical fine particle. Such a fine particle of Cu or Cu oxide 301 is coated with another catalyst 302 to form another fine particle, or mixed with another catalyst 302 to form a mixed fine particle 303, that is, alloyed fine particle. Such a fine particle is referred to as "nucleus fine particle 302" hereinafter. Carbon nano-fiber 304 such as carbon nano-coil, carbon nano-twist or carbon nano-rope is grown on the nucleus fine particle 302.

A fine particle of Cu or Cu oxide 301 becomes a fine particle the surface of which is coated with another catalyst 302 not entirely but partially. Alternatively, the fine particle of Cu or Cu oxide 301 is mixed with another catalyst 302 to form a mixed fine particle 303, for example, an alloy having an exposed surface of the fine particle of Cu or Cu oxide.

The fine particle of Cu or Cu oxide 301 is heated to melt to form a spherical fine particle by surface tension. That is to say, the fine particle of Cu or Cu oxide 301 is easy to become a fine particle. Particularly, since Cu or Cu oxide becomes a spherical fine particle having a radius larger than the film thickness of the film initially formed, a fine particle on the surface of which another catalyst 302 is partially formed, that is, a nucleus fine particle can be easily formed by heating.

Figure 3C:
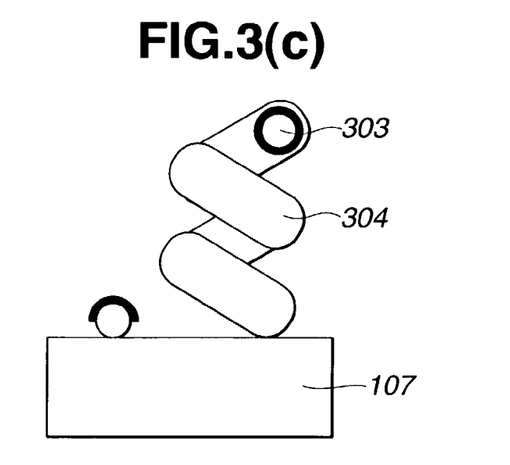

The state of the surface of the nucleus fine particle is important. For example, in the case of Cu—Ni binary alloy, the reaction of Cu with carbon is slow (such reaction barely proceeds): the reaction of Ni with carbon proceeds rapidly. Because of such a difference in the reactivity with carbon, the carbon nano-fiber can be hardly formed on the surface of Cu inside an alloy (front of the paper), but can be grown on the surface of Ni (back of the paper) as shown in FIG. 3(c). Actually, the carbon nano-fiber is grown on the surface of Ni; consequently, a catalyst alloy is formed as if it extrudes.

Figure 3D:
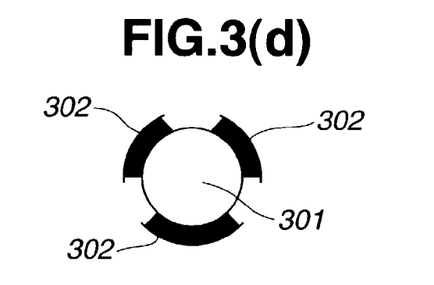

A carbon nano-rope has such a structure that plural carbon nano-fibers are twisted and intertwined. In the case of the carbon nano-rope, the spherical Cu oxide fine particle 301 has such structure of the surface of nucleus fine particle that the nucleus fine particle is separated into three portions which are coated with another catalyst 302 as shown in FIG. 3(d).

When a fine particle of alloy or mixed crystalline is used, a twisted carbon nano-fiber such as a carbon nano-coil, a carbon nano-twist, a carbon nano-rope can be formed. Contrary to this, when a fine particle different from an alloy (including, for example fine particle having the whole surface of Cu coated with Ni) or a fine particle different from mixed crystalline is used, a carbon nano-tube can be formed. It is hard to form a twisted carbon nano-fiber such as a carbon nano-coil, a carbon nano-twist, a carbon nano-rope, etc. by using a single catalyst. Accordingly, a catalyst composed of at least two different kinds of alloys is required (deposition is formed on a substrate). A catalyst may be not only a mixture, but also a compound at the time of start of reaction. Even if it is a mixture, it serves the same function as that of a compound by heating at a process.

Accordingly, the fiber diameter of the carbon nano-fiber 304 can be determined by the diameter of the nucleus fine particle 303 and further by the film thickness of Cu or Cu oxide film. For example, when a two-layer film composed of Ni film and Cu film formed by means of a vacuum arc deposition method is used as a catalyst, and when the thickness of Ni film is constant 5 nm and that of Cu film is 5 nm, a carbon nano-twist having the fiber diameter of about 90 nm can be obtained. Similarly, when the thickness of Cu film is 100 nm, a carbon nano-twist having the fiber diameter of about 90 nm can be obtained. In such a case, there is proportionality between the thickness of Cu film and the fiber diameter of the carbon nano-twist; when the thickness of Cu film is taken as x (nm), and the fiber diameter of the carbon nano-twist is taken as y (nm), an equation y=8.5x+50 is approximately valid.

Naturally, the values of the proportional coefficient and the intercept of such a proportional relationship change depending on the differences in the method of preparing a catalyst film and manufacturing conditions. This is because that the density of the film, orientation, smoothness of the surface, etc. change depending on the method of preparing a catalyst film and manufacturing conditions. It is also natural that the film thickness of another catalyst film takes part in such a proportional relationship.

The first, second and third films are not necessarily present independently, but a monolayer film composed of mixed films of such first, second and third films may be used. That is to say, the catalyst film may be a film comprising one or plural components selected from the group consisting of Cr, Mn, Fe, Co, Ni and oxide thereof, and one or plural components selected from the group consisting of Zn, In, Sn, Sb and oxide thereof, and Cu or Cu oxide Naturally, Al, Si, Ti, V, Nb, Mo, Hf, Ta, W or oxide thereof may be used instead of Cu or Cu oxide. The monolayer film is an oxide of binary or ternary alloy and may be preferably in a state of mixed crystalline. Even if Cu, Al, Si, Ti, V, Nb, Mo, Hf, Ta, W or oxide thereof is mixed as impurities into the layer of Cr, Mn, Fe, Co, Ni or oxide thereof, the same result can be obtained. Accordingly, the present invention includes such a case. When using Cu catalyst, Cu is pure at the time of vapor deposition on a substrate, but it is changed to copper oxide in the course of subsequent process. If it is necessary to carry out the reaction by using pure Cu intact, it may be desirable to carry out the reaction while supplying rare gas such as Ar etc.

While the substrate having a flat surface is shown in FIG. 1, it might have a curved surface. The number of the substrate is not specifically limited. The number and structure of the substrate may be adapted so that the decomposed gas of the raw material gas might come into contact with the catalyst film. For example, when the reactor is a cylinder, a plurality of cylinder-shaped substrates may be placed coaxially. Thereby, the mass production of carbon nano-fiber, particularly carbon nano-coil, carbon nano-twist or carbon nano-rope is feasible.

In FIG. 2(b), the multilayer film having a two-layers structure composed of a first catalyst film 204 and a second catalyst film 205 comprises a film containing one component selected from the group consisting of Cr, Mn, Co, Ni and oxide thereof, and a film containing one or plural components selected from the group consisting of Zn, In, Sn, Sb and oxide thereof. The multilayer film may be formed of a film containing plural components selected from the group consisting of Cr, Mn, Fe, Co, Ni and oxide thereof, and a film containing one component selected from the group consisting of Zn, In, Sn, Sb and oxide thereof. The multilayer film may be formed of a film containing one or plural components selected from the group consisting of Cr, Mn, Fe, Co, Ni and oxide thereof, and a film containing one or plural components selected from the group consisting of Cu, Al, Si, Ti, V, Nb, Mo, Hf, Ta, W and oxide thereof.

Figure 4:
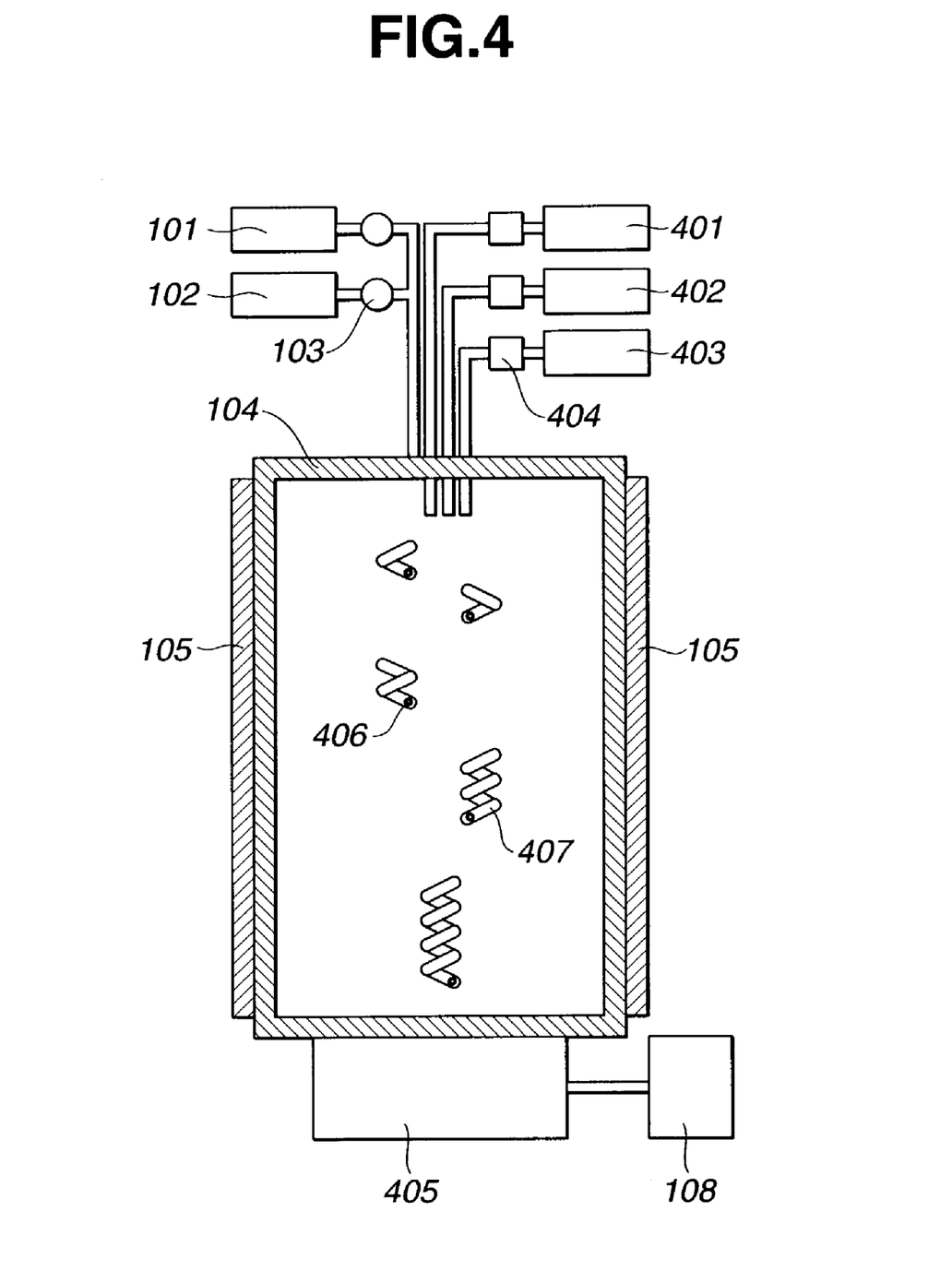
FIG. 4 is a diagrammatic view showing another apparatus for preparing carbon nano-fiber using a CVD method on the basis of fluidized bed method/fluid vapor method.

In FIG. 2(c), the monolayer film composed of a first catalyst film 206 comprises a mixture containing one component selected from the group consisting of Cr, Mn, Co, Ni and oxide thereof, and one or plural components selected from the group consisting of Zn, In, Sn, Sb and oxide thereof. The monolayer film may be formed of a mixture containing plural components selected from the group consisting of Cr, Mn, Fe, Co, Ni and oxide thereof, and one or plural components selected from the group consisting of Zn, In, Sn, Sb and oxide thereof. The monolayer film may be formed of a mixture containing one or plural components selected from the group consisting of Cr, Mn, Fe, Co, Ni and oxide thereof, and one or plural components selected from the group consisting of Cu, Al, Si, Ti, V, Nb, Mo, Hf, Ta, W and oxide thereof. The monolayer film may be formed of a mixture containing one or plural components selected from the group consisting of Cr, Mn, Fe, Co, Ni and oxide thereof, one or plural components selected from the group consisting of Zn, In, Sn, Sb and oxide thereof and one or plural components selected from the group consisting of Cu, Al, Si, Ti, V, Nb, Mo, Hf, Ta, W and oxide thereof FIG. 4 is a diagrammatic view showing the fundamental structure of an apparatus for preparing a carbon nano-fiber using a fluidized bed method (fluid vapor method) according to another embodiment of the present invention. In FIG. 4, similar parts shown in FIG. 1 are denoted by the same reference numerals and explanation is omitted.

By using a fluidized bed method (fluid vapor method), the continuous mass production of carbon nano-coil, carbon nano-twist or carbon nano-rope is feasible. The apparatus shown in FIG. 9 differs from the apparatus shown in FIG. 1 in that catalyst films are not formed on the substrate which are not placed in the reactor, but raw material gas and catalyst components are introduced into the reactor, and carbon nano-fiber formed in the reactor (particularly, twisted carbon nano-fiber such as carbon nano-coil, carbon nano-twist or carbon nano-rope) is stored in a collecting apparatus placed at an outlet of the reactor. Since the catalyst can be supplied continuously by such a method, the continuous production of carbon nano-fiber is feasible.

The catalyst material 401 may be a catalyst solution containing one or plural components selected from the group consisting of Cr, Mn, Fe, Co, Ni and oxide thereof, or a powder catalyst fine particle containing such components, or a solution containing catalyst fine particles in which are dispersed powder catalyst fine particles containing such components.

The catalyst material 402 may be a catalyst solution containing one or plural components selected from the group consisting of Zn, In, Sn, Sb and oxide thereof, or a powder catalyst fine particle containing such components, or a solution containing catalyst fine particles in which are dispersed powder catalyst fine particles containing such components.

The catalyst material 403 may be a catalyst solution containing a component of Cu or Cu oxide, or a powder catalyst fine particle containing such a component, or a solution containing catalyst fine particles in which are dispersed powder catalyst fine particles containing such a component.

These catalyst materials may be desirably a catalyst solution in order to form finer nucleus particle. Further, the catalyst material 403 may be a catalyst solution containing a component selected from the group consisting of Cu, Al, Si, Ti, V, Nb, Mo, Hf, Ta, W and oxide thereof, or a powder catalyst fine particle containing such a component, or a solution containing catalyst fine particles in which are dispersed powder catalyst fine particles containing such a component.

When the catalyst material is a catalyst solution or solution containing catalyst fine particle, a commercially available liquid transporting apparatus may be used as the catalyst material feed controller 404. When the catalyst material is a powder catalyst fine particle, a commercially available powder transporting apparatus may be used as the catalyst material feed controller 404.

When at least one of the catalyst materials is a catalyst solution or solution containing catalyst fine particle, it is desirable to equip a pulverizing mechanism such as a spray etc. with an approach inlet of a reactor. This is because that the solution is pulverized into liquid fine particles to form finer nucleus fine particles. The spray mechanism may be a generally used mechanical type or high voltage applying type (TAKIKAWA Hiroshi & KOBAYASHI Kazuyoshi "Removal of Incense Stick Smoke by Spray of Charged Drop of Water" Journal of Electric Society of Japan, A-117, 215 (1997)). The high voltage applying type is desirable because it can control the particle size by strength of voltage. Further, a method is available in which the solution or catalyst is decomposed into atomic or molecular size by hot plasma etc., then injected into a reactor.

The catalyst material introduced into the reactor is decomposed and re-condensed in the reactor to form a nucleus fine particle 406. The raw material gas is decomposed into carbon which adheres to the nucleus fine particle 406 to form a carbon nano-fiber 407 such as carbon nano-coil, carbon nano-twist or carbon nano-rope in the reactor. The reactor can be separated into a plurality of sections, that is, a section for decomposing the catalyst material, a section for forming a nucleus fine particle, a section for decomposing the raw material gas, and a section for synthesizing a carbon nano-fiber. Using plural reactors is desirable because the temperatures of each of the reactors can be controlled independently according to objects.

The carbon nano-fiber storing apparatus 405 is an apparatus for capturing and storing carbon nano-fiber such as carbon nano-coil, carbon nano-twist or carbon nano-rope emerging out of the reactor. It is desirable to place a filter in the storing apparatus 405 so as to prevent a solid particle from entering an exhaust apparatus.

While FIG. 4 shows a vertical type reactor, it may be a horizontal type as shown in FIG. 1. When the vertical type reactor is used in a fluidized bed method (fluidized vapor phase method), free fall by gravitation of a nucleus fine particle is available. It is, therefore, possible to decrease feed of gas introduced into the reactor, compared with the horizontal type reactor. While FIG. 4 shows an example in which the catalyst materials 401, 402 and 403 are supplied independently, it may be adopted that one or two of the three catalyst are mixed together to form a catalyst solution, powder catalyst fine particle or powder catalyst fine particle-containing solution in which are dispersed powder catalyst fine particles.

FIG. 5 to FIG. 10 show an example of result obtained by each of experiments by way of photomicrographs of scanning electron microscope of twisted carbon nano-fibers, particularly such as carbon nano-coil, carbon nano-twist, carbon nano-rope, etc. prepared by using an apparatus shown in FIG. 1.

In the experiments shown in FIG. 5 to FIG. 10 the manufacturing conditions, that is, the type of raw material gas and type of CVD method (catalyst CVD method or catalyst CVD method using a hot filament) are changed. As a result of visual inspection, it was confirmed that the quantity of a not-hollowed carbon nano-fiber like a carbon fiber produced was much rather than that of hollow one.

Figure 5:
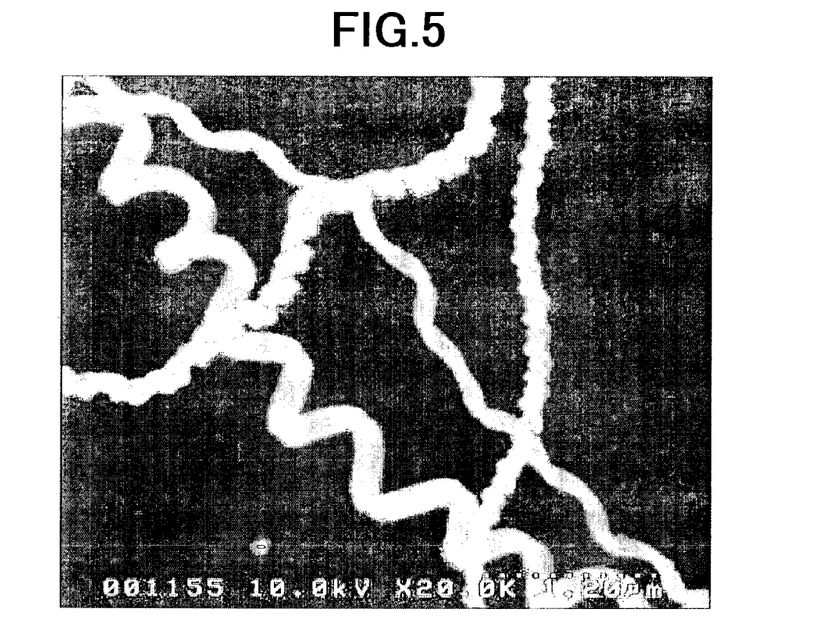
FIG. 5 is a photomicrograph of scanning electron microscope of carbon nano-coil prepared by the use of ATO film and FeO film as catalyst.

FIG. 5 shows a carbon nano-coil prepared by using a CVD method in which ATO film was used as a first film, FeO film was used as a second film, and $C_2H_2$ was used as raw material gas. He gas was used for diluting gas in this method.

Figure 6:
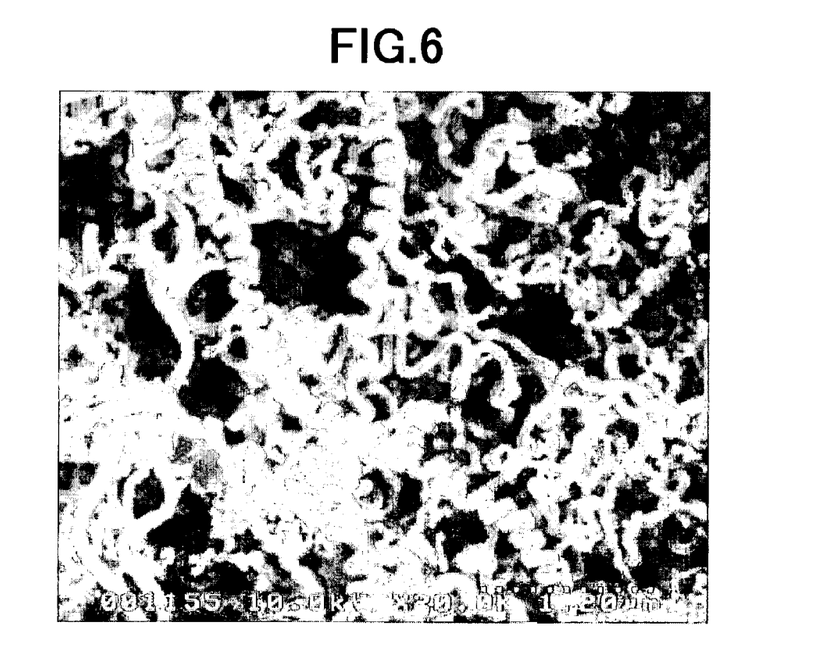
FIG. 6 is a photomicrograph of scanning electron microscope of carbon nano-coil prepared by the use of ITO film and Co film as catalyst.

FIG. 6 shows a carbon nano-coil prepared by using a CVD method in which an ITO film was used as a first film, a Co film was used as a second film, and $C_2H_2$ was used as raw material gas. He gas was used for diluting gas in this method.

Figure 7:
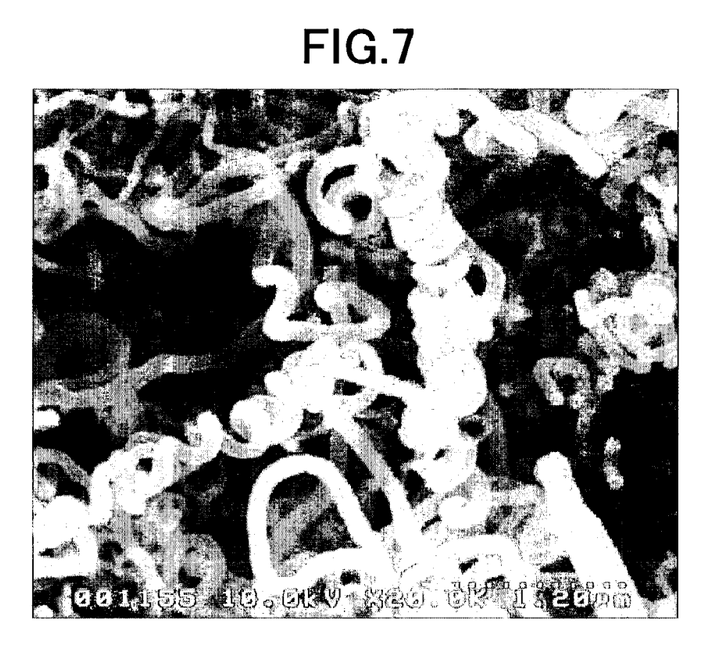
FIG. 7 is a photomicrograph of scanning electron microscope of carbon nano-coil prepared by the use of ITO film and Ni film as catalyst.

FIG. 7 shows a carbon nano-coil prepared by using a CVD method in which an ITO film was used as a first film, a Ni film was used as a second film, and $C_2H_2$ was used as raw material gas. As shown in FIG. 7 of a photomicrograph of a carbon nano-coil, it is confirmed that there is a marked tendency for a carbon nano-twist to be produced, rather than a carbon nano-coil when using a Ni catalyst. He gas was used for diluting gas in this method.

Figure 8:
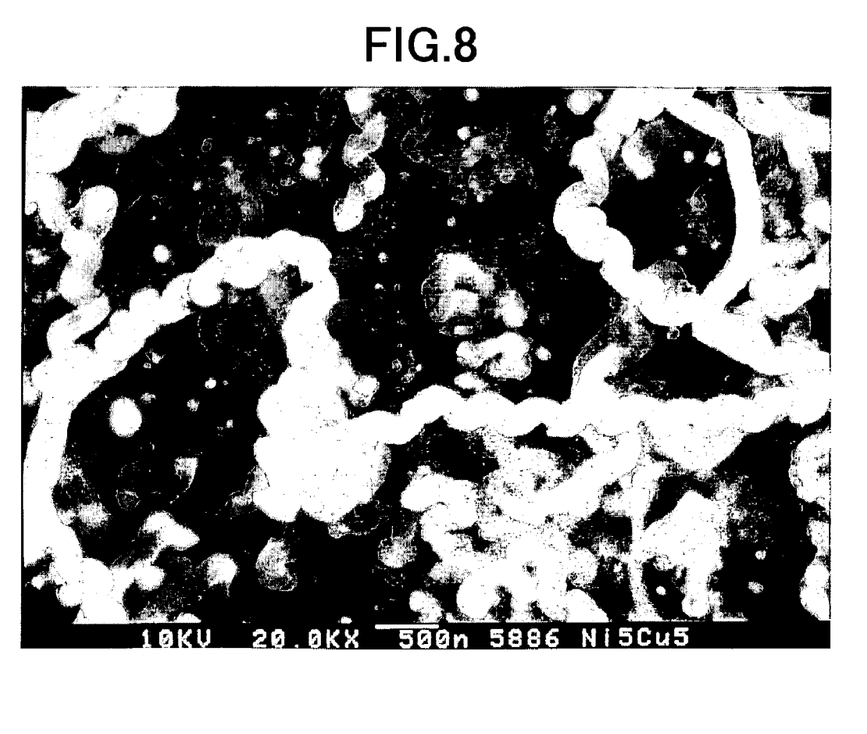
FIG. 8 is a photomicrograph of scanning electron microscope of carbon nano-twist prepared by the use of Cu film and Ni film as catalyst.

FIG. 8 shows a carbon nano-twist prepared by using a hot filament-supported CVD method in which a Cu film was used as a first film, a Ni film was used as a second film and $C_2H_4$ was used as diluting gas. It was confirmed that the fiber diameter can be controlled by changing the Cu film thickness while maintaining the Ni film thickness constant. The carbon nano-twist can not be produced by using only Ni film. Ar gas was used for diluting gas in this method.

The carbon nano-twist produced by the experiment shown in FIG. 8 is a carbon nano-twist at least a part of which is formed in a twisted state. Almost all of them have a fiber outer diameter in the range of 1 nm~1 μm, twist pitch in the range of 1 nm~500 nm and length of 5 nm and above. In this case, the fiber outer diameter and twist pitch of the carbon nano-twist produced are not constant, but have certain extent of ranges, respectively. However, such ranges can be narrowed depending on the manufacturing conditions.

Figure 9:
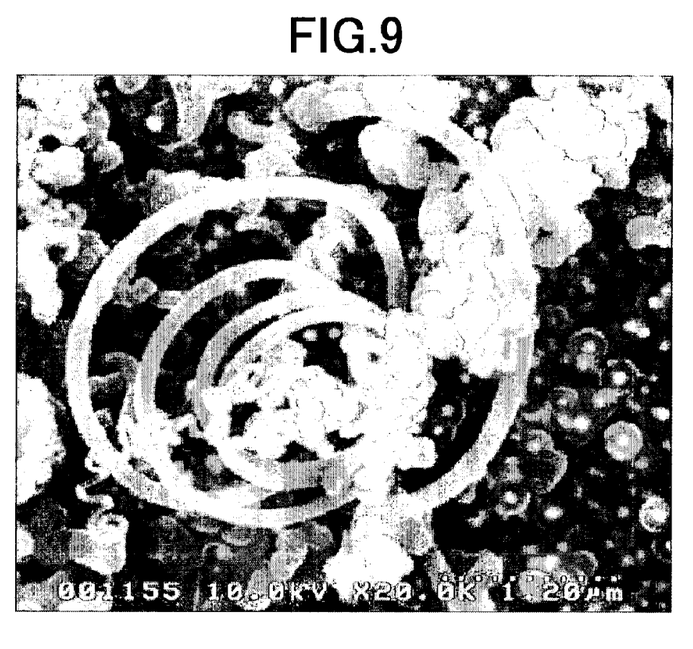
FIG. 9 is a photomicrograph of scanning electron microscope of carbon nano-coil a winding diameter of which is changed.

FIG. 9 shows a carbon nano-coil prepared by using a CVD method in which an ATO film was used as a first film and a NiO film was used as a second film. The winding diameter of the nano-coil changes continuously. Such as this, the winding diameter of the nano-coil and nano-twist of the present invention are not necessarily constant. He gas was used for diluting gas in this method.

The carbon nano-twist produced by the experiment shown in FIG. 5, FIG. 6, FIG. 7 and FIG. 8 is a carbon nano-twist at least a part of which is formed in a twisted state, respectively. Almost all of them have a fiber outer diameter in the range of 1 nm~1 μm, coil pitch in the range of 1 nm~1 μm and length of 5 nm and above. In these cases, the fiber outer diameters and coil pitches of the carbon nano-twists produced are not constant, but have certain extent of ranges, respectively. However, such ranges can be narrowed depending on the manufacturing conditions.

Figure 10:
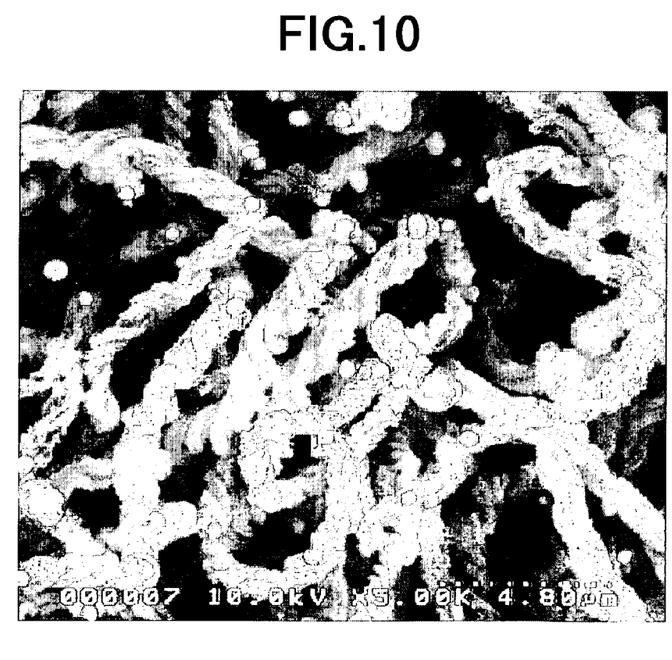
FIG. 10 is a photomicrograph of scanning electron microscope of carbon nano-rope by the use of Cu film and Ni film as catalyst.

FIG. 10 shows a carbon nano-rope prepared by using a hot filament-supported CVD method in which a Cu film was used as a first film, a Ni film was used as a second film, and $C_2H_2$ was used as diluting gas. The carbon nano-rope has a catalyst metal on its end. Plural carbon fibers are grown in a twisted state from the catalyst metal, which are intertwined each other. A fiber outer diameter of one carbon fiber is in the range of about 10 nm~500 nm. A fiber outer diameter of whole nano-rope is in the range of 400 nm~1 μm. Almost all of the carbon nano-ropes do not have smooth surface. The cross section of one carbon fiber is out of round. Under such manufacturing conditions, the yield of the nano-rope is almost 100%. He gas was used for diluting gas in this method.

The carbon nano-rope produced by the experiment shown in FIG. 10 is a carbon nano-rope at least a part of which is formed in a twisted state. Almost all of them have a fiber outer diameter in the range of 3 nm~1 μm, twist pitch in the range of 3 nm~1 μm and length of 5 nm and above. In such a case, the fiber outer diameter and twist pitch of the carbon nano-rope produced are not constant, but have certain extent of ranges, respectively. However, such ranges can be narrowed depending on the manufacturing conditions.

The manufacturing conditions adopted in the production of the carbon nano-fibers shown in FIGS. 5 to 10 are shown in Table below:

| | first catalyst film | | second catalyst film | | raw material gas | | diluting gas | | production method | | objective |
| | | | | | | | | | heating | | |
| | material | film thickness | material | film thickness | kind | flow rate | kind | flow rate | kind | temperature | product |
| --- | --- | --- | --- | --- | --- | --- | --- | --- | --- | --- | --- |
| FIG. 5 | ATO film | 200 nm | FeO film | 20 nm | $C_2H_2$ | 180 l/min | He | 420 l/min | CVD | 700° C. | nano-coil |
| FIG. 6 | ITO film | 200 nm | Co film | 20 nm | $C_2H_2$ | 180 l/min | He | 420 l/min | CVD | 700° C. | nano-coil |
| FIG. 7 | ITO film | 200 nm | Ni film | 20 nm | $C_2H_2$ | 180 l/min | He | 420 l/min | CVD | 700° C. | nano-coil (nano-twist) |
| FIG. 8 | Cu film | 100 nm | Ni film | 5 nm | $C_2H_4$ | 180 l/min | Ar | 420 l/min | hot filament CVD | 700° C.* | nano-twist |

-continued

| | first catalyst film | | second catalyst film | | raw material gas | | diluting gas | | production method | | objective product |
|---|---|---|---|---|---|---|---|---|---|---|---|
| | material | film thickness | material | film thickness | kind | flow rate | kind | flow rate | kind | heating temperature | |
| FIG. 9 | ATO film | 200 nm | NiO film | 20 nm | | 180 l/min | He | 420 l/min | CVD | 700° C. | nano-coil |
| FIG. 10 | Cu film | 100 nm | Ni film | 5 nm | C₂H₂ | 180 l/min | He | 420 l/min | hot filament CVD | 700° C.* | nano-rope |

*temperature of hot filament: 1,000° C.

The carbon fiber produced by the method of production of the present invention can be applied to a wide range of fields, such as, for example an electron emission source; electronic devices using a carbon fiber produced by the method of production of the present invention as an electron emission source such as a display tube, display panel, emission device, emission tube; a supporting apparatus for an electronic device tip such as a suspender, damping apparatus; an electronic device such as an inductance, electromagnetic coil, electromagnetic wave-generating apparatus, nano-antenna, EMI shielding material, etc; an electrode of a secondary battery or fuel battery (material used for an electrode of a secondary battery or fuel battery); a hydrogen absorbing material (using more desirably a carbon nano-rope); an electromagnetic wave absorbing material; additive for improving functions such as mechanical strength, color, electric conductivity, thermal conductivity, etc. of rubber, plastic, resin, metal, ceramics, concrete, etc: and a composite material prepared by mixing rubber, plastic, resin, metal, ceramics or concrete with carbon fibers produced by the method of production of the present invention.

A spiral or twisted carbon fiber, particularly a nano-fiber shows various properties which a straight carbon fiber does not possess. For example, the spiral or twisted carbon fiber has a large surface area compared with a straight carbon fiber having the same length of fiber, has a fine curved face or angle as seen from any direction, has an electrical inductance, and has a mechanical spring function.

As a result of visual inspection, it was confirmed that nearly 100% of carbon fiber produced was twisted carbon nano-fiber (carbon nano-coil, carbon nano-twist, carbon nano-rope).

According to the present invention, it is desirable to use a catalyst comprising one or plural components selected from the group consisting of Cr, Mn, Fe, Co, Ni and oxide thereof and one or plural components selected from the group consisting of Cu, Al, Si, Ti, V, Nb, Mo, Hf, Ta, W and oxide thereof. In case of a multilayer film, the order of films formed on a substrate is not particularly specified.

Above all, a combination of Ni or oxide thereof with Cu or oxide thereof is the most desirable. This is because that it is cheap from the standpoint of cost performance, it is a binary catalyst and yield is approximately 100%. On the other hand, the use of In increases costs.

When using a monolayer film or multilayer film in the present invention, the fiber diameter of the carbon nano-fiber (twisted carbon nano-fiber such as carbon nano-coil, carbon nano-twist, carbon nano-rope, etc.) can be easily controlled. This is because that since the catalyst contributing to the control of the fiber diameter is formed of a film (layer) such as a thin film or thick film, the control of the film thickness is easy and the control of the fiber diameter is feasible only by changing the film thickness. The catalyst, particularly Cu can be easily pulverized into fine particles by heating and a simple method.

According to the present invention, there is provided a method of preparing a carbon nano-fiber using a catalyst suitable for the preparation of a carbon nano-fiber.

According to another aspect of the present invention, there is provided a method of preparing a twisted carbon nano-fiber such as carbon nano-coil, carbon nano-twist, carbon nano-rope, etc. while controlling the fiber diameters thereof, and a method of the same in high volumes.

According to still another object of the present invention, there is provided a carbon nano-fiber, particularly twisted carbon nano-fiber suitably used for an electron emission source, an electron source for electronic device, a supporting apparatus for an electronic device tip (suspender, damping apparatus), an electronic device such as an inductance, electromagnetic coil, electromagnetic wave-generating apparatus, nano-antenna, EMI shielding material, etc., an electrode of a secondary battery or fuel battery (material used for an electrode of a secondary battery or fuel battery), a hydrogen absorbing material (using more desirably a carbon nano-rope), an electromagnetic wave absorbing material, and suitably used as an additive to be added into rubber, plastic, resin, metal, ceramics or concrete to form a composite material.

What is claimed is:

1. A method of preparing a carbon nano-fiber comprising the step of growing the carbon nano-fiber on a catalyst by means of a catalyst CVD method using carbon-containing raw material gas, wherein said catalyst comprises one or plural component selected from the group consisting of Cr, Mn, Fe, Co, Ni and oxide thereof and one or plural components selected from the group consisting of Sb and oxide thereof.

2. A method of preparing a carbon nano-fiber as defined in claim 1, wherein said catalyst further comprises one or plural components selected from the group consisting of Cu, Al, Si, Ti, V, Nb, Mo, Hf, Ta, W and oxide thereof.

3. A method of preparing a carbon nano-fiber as defined in claim 2, wherein said catalyst further comprises one or plural components selected from the group consisting of Zn and oxide thereof.

4. A method of preparing a carbon nano-fiber comprising the step of growing the carbon nano-fiber on a catalyst by means of a catalyst CVD method using carbon-containing raw material gas, wherein said catalyst comprises one or plural components selected from the group consisting of Cr, Mn, Fe, Co, Ni and oxide thereof and at least two components selected from the group consisting of Zn, Sb and oxide thereof.

5. A method of preparing a carbon nano-fiber comprising the step of growing the carbon nano-fiber on a catalyst by means of a catalyst CVD method using carbon-containing raw material gas, wherein said catalyst comprises one or plural components selected from the group consisting of Cr, Mn, Fe, Co, Ni and oxide thereof and one or plural components selected from the group consisting of Sb and oxide thereof.

6. A method of preparing a carbon nano-fiber comprising the step of growing the carbon nano-fiber on a catalyst by means of a catalyst CVD method using carbon-containing raw material gas, wherein said catalyst comprises one or plural components selected from the group consisting of Cr, Mn, Fe, Co, Ni and oxide thereof and plural components selected from the group consisting of In, Sb and oxide thereof.

* * * * *